May 21, 1968

I. GINSBURGH ET AL 3,384,813

CHARGE DENSITY METER

Filed Aug. 24, 1965

INVENTORS.
Irwin Ginsburgh
Lawrence T. Wright

United States Patent Office 3,384,813
Patented May 21, 1968

3,384,813
CHARGE DENSITY METER
Irwin Ginsburgh, Morton Grove, and Lawrence T. Wright, Homewood, Ill., assignors to Standard Oil Company, Chicago, Ill., a corporation of Indiana
Filed Aug. 24, 1965, Ser. No. 482,206
4 Claims. (Cl. 324—32)

This invention relates to a device for measuring the density of electric charges in flowing or quiescent liquids and more specifically to a charge density meter, the operation of which is independent of the shape of the vessel it is to be used in and of its position in the vessel.

Electric charges are generated by a flowing liquid during transfer of the liquid, especially during transfer through a filter. Such charges tend to accumulate in the liquid, but may leak away by conduction. In a liquid of high conductivity, this leakage is rather rapid, but where the conductivity of the liquid is low, as with most refined hydrocarbon liquids, the rate of leakage is low and the electric charges accumulate fairly rapidly. Build-up may be to such a level that there exist high potential differences between the liquid and its surroundings, resulting in an electric break-down in the form of a spark. If the liquid is an inflammable one, there exists an extremely hazardous condition due to the possibility of ignition of combustible vapor, resulting in explosions and fires. The transfer or loading of certain petroleum products, e.g. distillate fuels, or low vapor product hydrocarbons being loaded into a compartment that contains vapor from the previous high vapor pressure hydrocarbon, creates such a condition. In recent years there have been an increasing number of explosions at loading racks that have been filling trucks with hydrocarbon fuels. Up to now, loaders on racks have never had any device which would indicate to them that the hydrocarbon liquids being loaded contain a hazardous concentration of electric charge, as for example, a charge density in excess of about 10 micro coulombs per cubic meter. Many arbitrary restrictions (e.g rate of pumping, absence of a second phase, etc.) are placed on the handling of inflammable hydrocarbon liquids as a safety measure against the hazards mentioned above. These restrictions are necessarily arbitrary due to the difficulty in predicting the amount of charge which will accumulate during a transfer. The ability to accurately measure the charge build-up would greatly reduce the hazards and provide relative ease in the handling of such inflammable liquids.

Previously, devices have been developed for the purpose of measuring the charge density in hydrocarbon liquids, but these devices have proven to be of interest mainly in the laboratory and not in commercial use. One device is described on page 332 of volume 37 of the Journal of Scientific Instruments in an article entitled, "Measurement of Space Density of Charge in Flowing Liquids" (1960).

In general, prior-art devices of the above-mentioned type have been limited in their applicability. Basically, the device contains a sensing element which includes a signal from a charged liquid. The nature of the induced signal is related to the distance between the grounded sensing element and the grounded walls of the vessel in which the device is contained. To accurately measure the charge, therefore, the sensing element must be circumferentially exposed to liquid which is between equally spaced grounded surfaces. Were this condition not present, the measured charge would not be indicative of the charge contained in the liquid. It is for this reason that the prior-art devices could only be used in a pipe and had to be mounted along the axis of the pipe.

In addition, the calibration of the devices varied with the pipe size, thus requiring special large scale calibration equipment for each pipe size. A further undesirable feature of prior-art devices is that they generally had a very long rotating shaft which was subject to vibration and whip at high rotation speeds.

We have discovered that a device of the type mentioned can be modified to make it independent of the pipe size and to make it particularly useful for industry loader service in pipes or vessels. The improved device can be used in a vessel and does not require installation along any axis. In addition, problems heretofore encountered at high rotational speeds have been eliminated. The present device has a very short shaft and exhibits practically no vibration or whip. Furthermore, the present device is quite small and compact compared to the previous one.

Generally stated the improved device for measuring the charge density of a charged liquid comprises a sensing device previously known, together with an outer sleeve-like element. The grounded sleeve-like element is always at a constant distance from the sensing element, thus allowing the sensing element to be exposed to liquid which is between equally spaced grounded surfaces. Since the charge, which is induced by and on the sensing elements, is induced from the liquid between the grounded surfaces, the boundaries of the electric field to be measured are defined and always fixed in dimension. Regardless of the nature of the vessel or its position in the vessel, the device will only measure representative samples of liquid flowing into said space between grounded elements. We can see then that the sleeve-like element provides a constant electrical geometry, e.g., a defined electrical field whose boundaries are always constant, thereby making the instrument independent of where it is used.

More specifically, the sensing device comprises an electrically grounded hollow metal outer cylinder positioned coaxially around and in close proximity to an electrically insulated metal inner cylinder, said inner cylinder being capable of rotation in order to generate an electrical signal by induction from an electrically charged liquid, each of said outer and inner cylinders being provided with a plurality of apertures. The apertures in the outer cylinder are positioned with respect to the apertures in the inner cylinder, so that rotation of said inner cylinder will alternately expose the surface of said inner cylinder to the charged liquid and screen it by said outer cylinder, thus generating an electrical signal by electrostatic induction, the magnitude and frequency of which depending on the speed of rotation, number of apertures, etc. Advantageously, the inner and outer cylinders each contain a pair of diametrically opposite apertures and preferably each aperture of the pair covering 90° of the respective cylinder. In the preferred embodiment, a hollow inner cylinder is used. If the inner cylinder is solid, then a chordal channel, terminating in said apertures, is provided across the cylinder, said channel preferably extends across the diameter of said inner cylinder. Said inner cylinder is rotated by driving means, preferably an air motor which is explosion-proof and is readily available in a small diameter configuration. Interconnected between the driving means and the inner cylinder is a connecting means, preferably an insulated coupling, which provides the mechanical connection and the necessary insulation. The inner cylinder has attached thereto an electrically isolated rotary seal which is designed to prevent the leakage of liquid into the back end of the device and yet will permit the inner cylinder to rotate. Means are provided to support the outer cylinder coaxially with respect to the inner cylinder suitably, bearings are provided, one at each end of the inner cylinder, to allow the inner cylinder to rotate. Such bearings are mounted so as to provide the required electrical insulation. The induced charge is picked up by a slip ring and brush arrangement mounted on the inner cylinder, and is then fed to an amplifying and indicating system. The indicating device may be provided with equipment which will alarm when the charge density in the liquid reaches a given level. Preferably, the driving means has a small diameter so that it can be situated within a two-inch diameter steel pipe.

The entire assembly is coaxially mounted within an electrically grounded sleeve-like element (hereinafter referred to as the sleeve) at such distance as will provide an annular space between the sleeve and the outer cylinder, said annular space is suitably provided by a sleeve which has a diameter of between 2 and 4 diameters of said outer cylinder, but, of course, it may be larger or smaller. Said sleeve is provided with a plurality of openings permitting a charged liquid to flow into the annular space between the sleeve and the outer cylinder. The liquid within said annulus at any given time will be a representative sample of the whole. Since the distance between the grounded outer cylinder and the sleeve is everywhere equal; and since it is the liquid within the annulus that will be measured, the rotation of said inner cylinder will induce a signal from a liquid which has a constant electrical boundary, regardless of the nature of the vessel in which the device is used. The flow of said liquid, through said openings in the sleeve, should not generate additional charge in the liquid, nor should it discharge the liquid; and since the sleeve must provide an electrically grounded boundary, of course, the sleeve and any liquid contained in said openings of the sleeve should maintain the electrically grounded condition. Accordingly, the sleeve may be between 20 and 80 percent open and each opening within the sleeve less than 1/3 the diameter of said annular space.

It is desirable that the sleeve length extend beyond each end of the apertures in said cylinders, preferably such extension on each end being at least equal to the diameter of said annular space. However, it is advantageous that the length of the space between the closed end of sleeve and the apertures be large enough so as to avoid the possibility of measuring the charge in liquid trapped in such space at said closed end. It is undesirable to measure such liquid as it is not a representative sample.

In addition to providing a constant electrical geometry, the sleeve also serves as a mechanical protection for the sensitive rotating inner cylinder.

The present invention will be better understood by the following description of a preferred embodiment thereof, given in connection with the accompanying drawings wherein.

Figure 1:
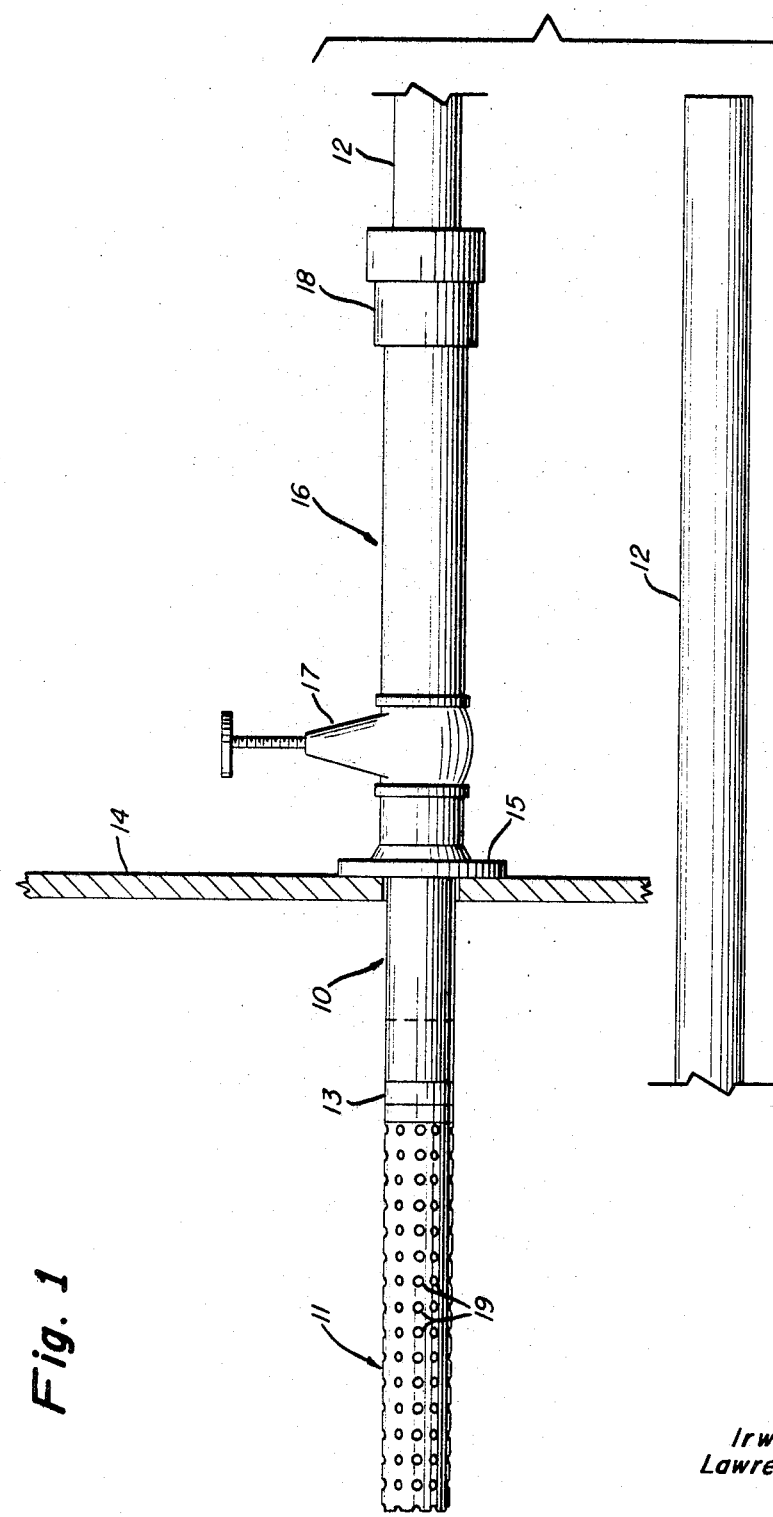
FIGURE 1 is an overall view of the device mounted in a wall of a tank illustrating one embodiment of the invention.

Referring to FIGURE 1, the improved charge density meter 10, is shown with sleeve 11, containing openings 19, which sleeve provides the meter with a constant electrical geometry so that the operation of the meter is independent of the shape of the vessel it is to be used in and of its position in the vessel. Sleeve 11 is joined to a 2-inch pipe 12, by means of main support cylinder 13. Device 10, is supported by pipe 16, and is secured to wall 14 of the tank in which it is used by means of flange 15 which attaches pipe 16 to wall 14. Device 10 is further held in position by gate valve 17, which functions as a shut-off valve to facilitate installation and removal of device 10 from pipe 16, and during such installation or removal seepage to the back end of the device, of liquid in pipe 16 is prevented by packing glands 18.

Figure 2:
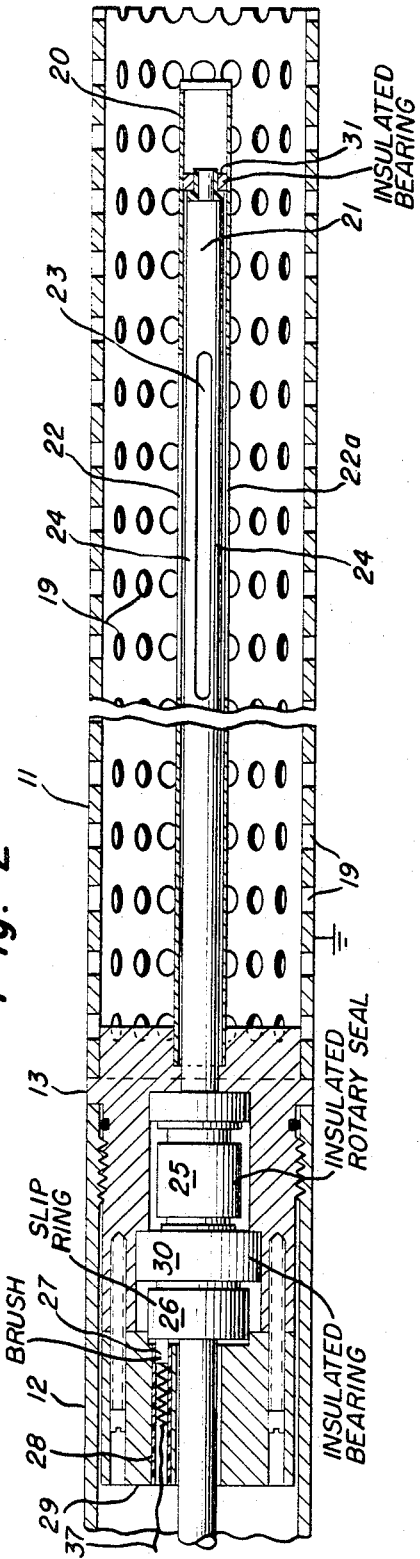
FIGURE 2 is an enlarged view of the sensing end of the device of FIGURE 1, partly in cross-section.

Referring to FIGURE 2, grounded hollow metal outer cylinder 20, containing diametrically opposite 90° apertures 22 and 22a, is positioned coaxially around and in close proximity to insulated metal cylinder 21, containing 90° aperture 23, and a diametrically opposite 90° aperture (not shown) thus forming a pair of circumferential sections 24, between aperture 23 and its corresponding diametrically opposite aperture, which provide the surface area for exposure through apertures 22 and 22a to the charged liquid.

Affixed to cylinder 21 is an electrically insulated rotary seal 25, which is designed to prevent leakage of liquid into the back end of the device and still allow cylinder 21 to rotate. Mounted to cylinder 21 and within main support cylinder 13 is slip-ring 26 from which the induced signal which is generated from the charged liquid by the rotation of cylinder 21, is picked up by brush 27 seated with insulated channel 28. Channel 28 is within the signal brush cylinder 29 which is attached to main support cylinder 13. Cylinder 21 is supported and allowed to rotate within cylinder 20 by insulated bearing 30, seated in main support cylinder 13 and by insulated bearing 31, fixed within cylinder 20.

Figure 3:
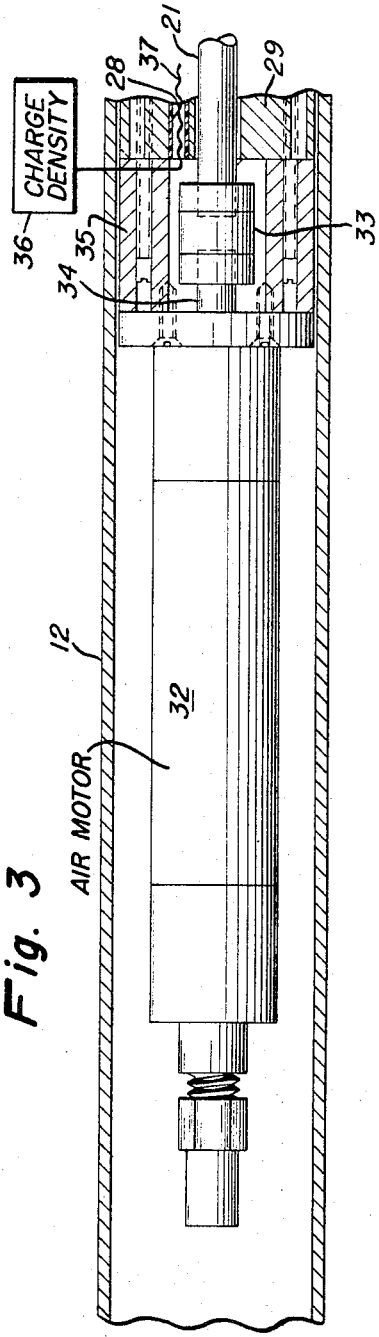
FIGURE 3 is an enlarged view of the driving end of FIGURE 1, partly in cross-section.

An external charge density indicator 36 is connected by wire 37 to brush 27 through channel 28 as schematically shown in FIG. 3.

Referring to FIGURE 3, air motor 32, designed to rotate cylinder 21, is connected to cylinder 21 by means of insulated coupling 33 and rotary shaft 34, located within auxiliary support cylinder 35.

From the foregoing description various modifications in the details of construction and operation of the present invention will become apparent to the skilled artisan, and as such, these fall within the spirit and scope of the present invention.

We claim:

1. A device for measuring the density of electrostatic charges accumulated in a liquid, comprising a grounded, hollow, metal outer cylinder, having a plurality of apertures, said outer cylinder coaxially surrounding, and in close proximity to an electrically insulated metal inner cylinder, said inner cylinder also having a plurality of apertures positioned with respect to said apertures of said outer cylinder to alternately expose said inner cylinder to said charged liquid and screen it by said outer cylinder, said inner cylinder being capable of rotation within said outer cylinder in order to generate the electrical signal from an electrically charged liquid by induction, driving means to rotate the inner cylinder, means to connect the inner cylinder and the driving means, means to support the outer cylinder coaxially with respect to the inner cylinder, means connected to said inner cylinder for determining the magnitude of the induced signal, and an electrically grounded sleeve-like element coaxially surrounding and connected to said outer cylinder at such distance as will provide an annular space between the sleeve-like element and outer cylinder, said sleeve-like element containing a plurality of openings, permitting said liquid to flow from the exterior of said sleeve-like element into said annulus without generating additional charge in the liquid and without discharging said liquid, while maintaining the electrically grounded condition of the sleeve-like element.

2. The device of claim 1 wherein said inner cylinder contains a pair of diametrically opposite apertures and said outer cylinder contains a pair of diametrically opposite apertures aligned with said apertures of said inner cylinder.

3. The device of claim 1 wherein said driving means is an air motor.

4. A device for measuring the charge density of a flowing liquid, comprising a grounded, hollow, metal outer cylinder having a pair of diametrically opposite 90° apertures, said outer cylinder coaxially surrounding and in close proximity an electrically insulated metal inner cylinder having a pair of diametrically opposite 90° apertures aligned with said apertures of said outer cylinder, said inner cylinder being capable of rotation in order to generate an electric signal by induction from an electrically charged liquid, an air motor to rotate said inner cylinder, an insulated coupling positioned between and interconnected to said motor and said inner cylinder, means connected to said inner cylinder for determining the magnitude of the induced electric signal, and an electrically grounded perforated sleeve positioned coaxially around said outer cylinder at such distance as will provide an annular space between the sleeve and said outer cylinder in order to accommodate the flow of the electrically charged liquid through said perforations and by said outer cylinder to induce said electrical signal.

References Cited

UNITED STATES PATENTS

| | | | |
|---|---|---|---|
| 2,810,879 | 10/1957 | Cade et al. | 324—30 |
| 2,832,039 | 4/1958 | Hardesty | 324—30 |
| 2,980,855 | 4/1961 | Moore | 324—32 X |

RUDOLPH V. ROLINEC, *Primary Examiner.*

C. F. ROBERTS, *Assistant Examiner.*